(12) United States Patent
Dolesh (10) Patent No.: US 9,956,835 B2
(45) Date of Patent: May 1, 2018

(54) ANTI-RELEASE TRAILER CONNECTION

(71) Applicant: SHEM, LLC, Hagerstown, IN (US)

(72) Inventor: William L. Dolesh, Richmond, IN (US)

(73) Assignee: Shem, LLC, Hagerstown, IN (US)

( * ) Notice: Subject to any disclaimer, the term of this patent is extended or adjusted under 35 U.S.C. 154(b) by 0 days. days.

(21) Appl. No.: 14/838,952

(22) Filed: Aug. 28, 2015

(65) Prior Publication Data

US 2016/0059649 A1 Mar. 3, 2016

Related U.S. Application Data

(60) Provisional application No. 62/043,823, filed on Aug. 29, 2014.

(51) Int. Cl.
| | |
|---|---|
| *B60D 1/28* | (2006.01) |
| *B62D 53/08* | (2006.01) |
| *B62D 53/10* | (2006.01) |
| *B60D 1/62* | (2006.01) |

(52) U.S. Cl.
CPC ............... *B60D 1/28* (2013.01); *B60D 1/62* (2013.01); *B62D 53/08* (2013.01); *B62D 53/10* (2013.01)

(58) Field of Classification Search
CPC . B60D 1/28; B60D 1/62; B62D 53/08; B62D 53/10
See application file for complete search history.

(56) References Cited

U.S. PATENT DOCUMENTS

| | | | | |
|---|---|---|---|---|
| 5,176,396 | A * | 1/1993 | Hawthorne | ............ B62D 53/10 280/434 |
| 5,472,223 | A * | 12/1995 | Hawthorne | ............ B62D 53/12 280/434 |
| 7,510,203 | B2 * | 3/2009 | Domine | ............... B62D 53/061 172/439 |
| 8,615,347 | B2 * | 12/2013 | Alguera Gallego | . B62D 53/085 280/433 |
| 2011/0147142 | A1 * | 6/2011 | Standen | .................... B60T 7/20 188/152 |

* cited by examiner

*Primary Examiner* — Joseph M Rocca
*Assistant Examiner* — Michael R Stabley
(74) *Attorney, Agent, or Firm* — Banner & Witcoff, Ltd.

(57) ABSTRACT

A system configured for use with a vehicle includes a trailer connection mechanism configured to be mounted on the vehicle and including a release actuator configured to release the connection between the trailer connection mechanism and a trailer, a release assembly connected to the release actuator and configured to cause the release actuator to release the connection between the trailer connection mechanism and the trailer upon receiving user input, and an anti-release mechanism connected to the trailer connection mechanism. The anti-release mechanism is configured to detect statuses of a transmission and a brake system of the vehicle, and to selectively permit or prevent operation of the release actuator to release the connection between the trailer connection mechanism and the trailer based on the status of at least one of the brake system and the transmission.

27 Claims, 6 Drawing Sheets

ANTI-RELEASE TRAILER CONNECTION

CROSS-REFERENCE TO RELATED APPLICATION

This application is a non-provisional of, and claims priority to, U.S. Provisional Application No. 62/043,823, filed Aug. 29, 2014, which prior application is incorporated by reference herein in its entirety and made part hereof.

TECHNICAL FIELD

The present invention generally relates to a trailer connection for a vehicle and, in some more specific embodiments, to a trailer connection that prevents disconnection of the trailer during unsafe conditions.

BACKGROUND

Trucks and other vehicles are often configured for pulling trailers, and some trucks may be configured with an automatic trailer connection that can connect or release the trailer by actuating a control interface (a release button etc.) from inside the operator cab. Terminal tractors or yard tractors are one example of a truck that often uses an automatic trailer connection, as these vehicles typically connect and disconnect from trailers repeatedly during use. However, automatic connection mechanisms can be accidentally released during use, such as by the operator bumping the handle, button, switch, etc., that is used to operate the mechanism. This can be hazardous, particularly if the mechanism is released while the vehicle is moving.

Thus, while certain vehicles and trailer connection mechanisms for such vehicles according to existing designs provide a number of advantageous features, they nevertheless have certain limitations. The present invention seeks to overcome certain of these limitations and other drawbacks of the prior art, and to provide new features not heretofore available.

BRIEF SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Aspects of the disclosure relate to a system for use with a vehicle that includes a chassis supported by a plurality of wheels, a drivetrain including an engine and a transmission operably coupled to transfer power to at least one of the wheels, and a brake system connected to at least one of the wheels. The system includes a trailer connection mechanism configured to be mounted on the vehicle and configured for releasable connection to a trailer, with the trailer connection mechanism including a release actuator configured to release the connection between the trailer connection mechanism and the trailer, a release assembly connected to the release actuator and configured to cause the release actuator to release the connection between the trailer connection mechanism and the trailer upon receiving user input, and an anti-release mechanism connected to the trailer connection mechanism. The anti-release mechanism is configured to detect statuses of a transmission and a brake system of the vehicle, and to prevent operation of the release actuator to release the connection between the trailer connection mechanism and the trailer unless the transmission is in Park and the brake system is engaged. The trailer connection mechanism may be a fifth-wheel mechanism or other connection mechanism.

According to one aspect, the anti-release mechanism further comprises a pneumatic valve configured to be activated when the transmission is in Park and the brake system is engaged, to permit operation of the release actuator to release the connection between the trailer connection mechanism and the trailer. The anti-release mechanism may also include a pneumatic inversion valve in communication with the release assembly and with the pneumatic valve, where activation of the pneumatic valve causes activation of the pneumatic inversion valve to permit operation of the release actuator to release the connection between the trailer connection mechanism and the trailer. Further, the pneumatic valve may be configured to be in communication with a trailer brake on the trailer, where activation of the pneumatic valve is also configured to cause the trailer brake to be engaged when the transmission is in Park and the brake system is engaged.

According to another aspect, the anti-release mechanism further includes a pneumatic inversion valve in communication with the release assembly, wherein the pneumatic inversion valve can be activated to permit operation of the release actuator to release the connection between the trailer connection mechanism and the trailer.

According to a further aspect, the anti-release mechanism is further configured to cause activation of a trailer brake on the trailer when the transmission is in Park and the brake system is engaged.

According to yet another aspect, the anti-release assembly includes a computer component connected to the transmission and the brake system and configured to detect the statuses of the transmission and the brake system. The computer component is further connected to the anti-release mechanism and is configured to cause the anti-release mechanism to prevent operation of the release actuator unless the transmission is in Park and the brake system is engaged.

Additional aspects of the disclosure relate to a system for use with a vehicle as described above, where the system includes a trailer connection mechanism mounted on the vehicle and including a release actuator configured to release the connection between the trailer connection mechanism and the trailer, a pneumatic system connected to the trailer connection mechanism and configured to operate the release actuator, a vehicle controller having a memory and a computer processor, where the vehicle controller is connected to the transmission and the brake system and is configured to detect statuses of the transmission and the brake system, and an anti-release mechanism connected to the trailer connection mechanism, the pneumatic system, and the vehicle controller. The anti-release mechanism is configured for selectively preventing or permitting operation of the release actuator to release the connection between the trailer connection mechanism, and the vehicle controller is configured to cause the anti-release mechanism to prevent or permit operation of the release actuator based on the status of at least one of the transmission and the brake system. The trailer connection mechanism may be a fifth-wheel mechanism or other connection mechanism.

According to one aspect, the anti-release mechanism further includes a pneumatic valve located within the pneumatic system, wherein the pneumatic valve is configured to be activated by the vehicle controller based on the status of the at least one of the transmission and the brake system, to permit operation of the release actuator to release the connection between the trailer connection mechanism and the trailer. The anti-release mechanism may also include a pneumatic inversion valve located within the pneumatic system and in communication with the release assembly and with the pneumatic valve, where activation of the pneumatic valve causes pneumatic flow to activate the pneumatic inversion valve, and activation of the pneumatic inversion valve causes pneumatic flow to permit operation of the release actuator to release the connection between the trailer connection mechanism and the trailer. Further, the pneumatic system and the pneumatic valve may be configured to be in communication with a trailer brake on the trailer, where activation of the pneumatic valve is further configured to cause the trailer brake to be engaged. Still further, a release assembly may be connected to the release actuator and the pneumatic system, where the release assembly includes a release button and an additional pneumatic valve in communication with the pneumatic inversion valve and the release actuator. Such a release assembly may be configured such that, upon activation of the pneumatic inversion valve, the release button is configured to receive user input to activate the additional pneumatic valve to cause pneumatic flow to activate the release actuator to release the connection between the trailer connection mechanism and the trailer.

According to another aspect, the anti-release mechanism includes a pneumatic inversion valve located within the pneumatic system and in communication with the release assembly, wherein the pneumatic valve can be activated to cause pneumatic flow to permit operation of the release actuator to release the connection between the trailer connection mechanism and the trailer.

According to a further aspect, the anti-release mechanism is further configured to cause activation of a trailer brake on the trailer when permitting operation of the release actuator.

According to yet another aspect, the vehicle controller is configured to cause the anti-release mechanism to prevent operation of the release actuator unless the transmission is in Park and the brake system is engaged.

Further aspects of the disclosure relate to vehicle as described above, provided with some or all of the components of the system described above, including the trailer connection mechanism, the pneumatic system, the vehicle controller, and/or the anti-release mechanism. Such components of the system may be configured in any manner described above.

Still further aspects of the disclosure relate to a method of assembling a vehicle that includes providing the vehicle with some or all of the components of the system described above, including the trailer connection mechanism, the pneumatic system, the vehicle controller, and/or the anti-release mechanism. Such components of the system may be configured in any manner described above. Other aspects of the disclosure relate to a method of operating a system as described above, including operating the anti-release mechanism to selectively prevent or permit disconnection of the trailer based on the status of at least one of the transmission and the brake system. A vehicle controller or other computer component(s) may be used in connection with this operation.

Other features and advantages of the disclosure will be apparent from the following description taken in conjunction with the attached drawings.

BRIEF DESCRIPTION OF THE DRAWINGS

To understand the present disclosure, it will now be described by way of example, with reference to the accompanying drawings in which.

It is understood that certain components may be removed from the drawing figures in order to provide better views of internal components.

DETAILED DESCRIPTION

While this invention is susceptible of embodiment in many different forms, there are shown in the drawings, and will herein be described in detail, preferred embodiments of the invention with the understanding that the present disclosure is to be considered as an exemplification of the principles of the invention and is not intended to limit the broad aspect of the invention to the embodiments illustrated.

Figure 1:
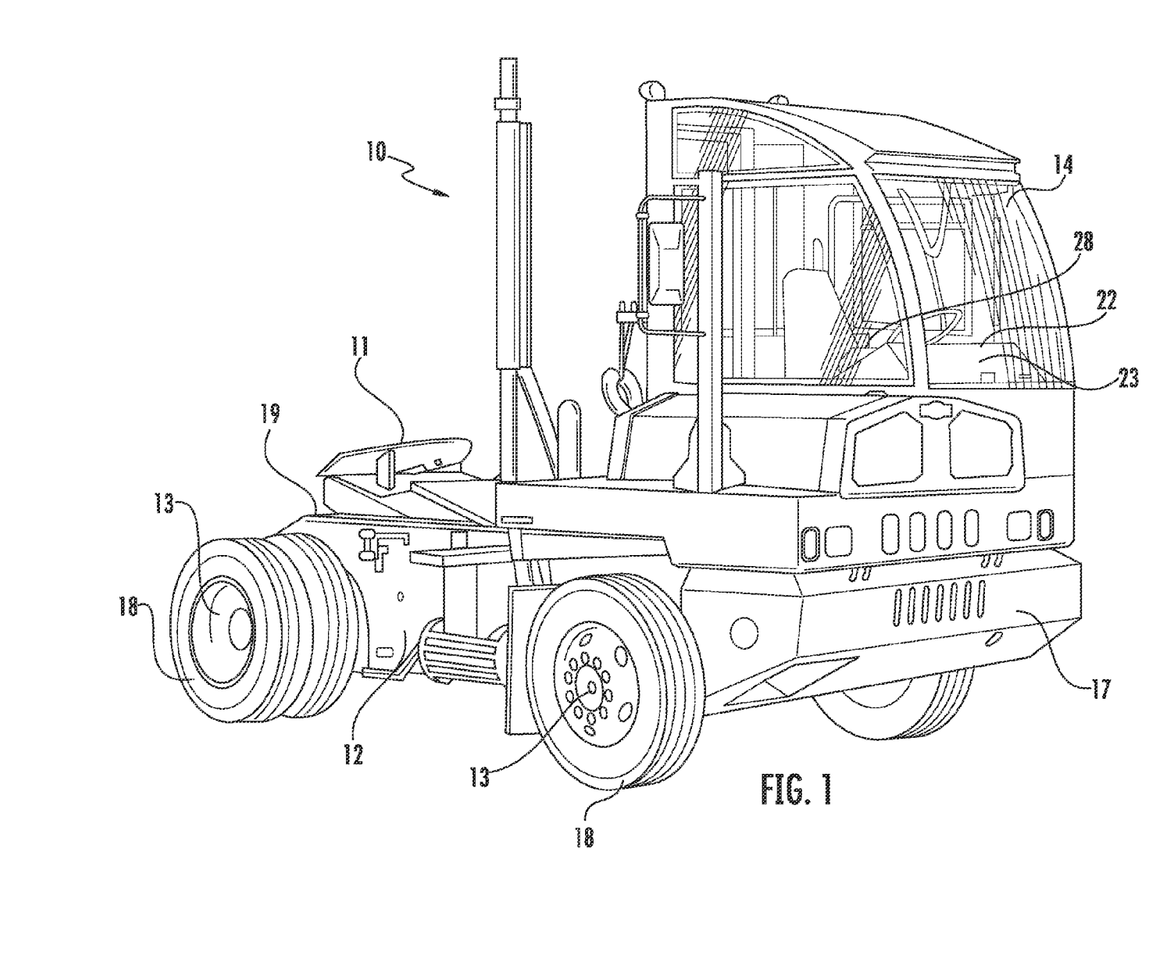
FIG. 1 is a perspective view of one embodiment of a vehicle according to aspects of the present disclosure, in the form of a terminal tractor or yard tractor.
Figure 2:
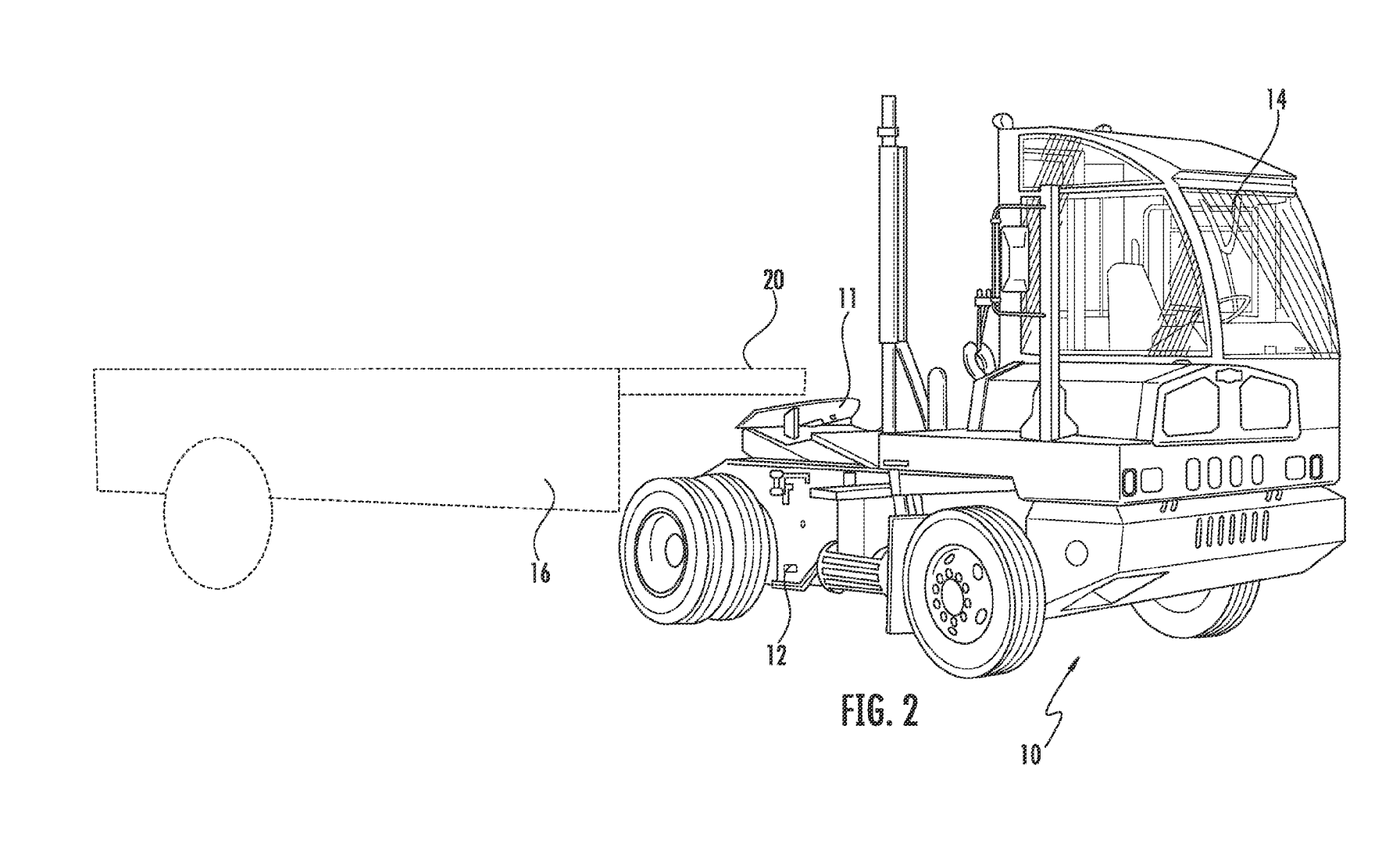
FIG. 2 is a side view of the vehicle of FIG. 1, with a trailer connected to the vehicle shown schematically in broken lines.

Referring now in detail to the Figures, FIGS. 1-2 illustrate a vehicle of the present disclosure, generally designated with the reference numeral 10. In one embodiment, the vehicle is in the form of a terminal tractor or yard tractor, configured for moving trailers around a terminal, yard, or other such area. It is understood that aspects and features of the present invention can be incorporated into various types of vehicles, including other heavy-duty vehicles, medium-duty vehicles or light vehicles of various applications, including highway trucks, semi-trailers, and the like.

The vehicle 10 generally includes a chassis 12 supporting an operator cab 14 that is mounted on the chassis 12. The vehicle 10 may also include a body (not shown) in some embodiments, which may also be mounted on the chassis, and which may be configured for a specific functionality. The chassis 12 is a truck chassis and may be at least partially formed by frame members or rail members, and the chassis 12 has a front portion 17 for supporting the operator cab 14 and a rear portion 19 behind the operator cab 14. As is known in the art, the chassis 12 has a front axle 13 and one or more rear axles 13 which in turn are attached to wheels 18 for movement of the chassis 12 along a surface. A trailer connection mechanism 11 may be mounted on the rear portion 19 of the chassis 12 and may be configured for connection to a trailer 16 (see FIG. 2). The trailer 16 may have a complementary connection mechanism 20, such that the trailer connection mechanism 11 is configured to connect to the complementary connection mechanism 20 to connect the trailer 16 to the vehicle 10. The trailer connection mechanism 11 may be configured for automatic operation to connect and disconnect from the trailer 16, such as by using an actuator located in the operator cab 14 or on the exterior of the vehicle, as described below.

Additionally, the vehicle 10 has a drivetrain that may include an engine (not shown) connected to a transmission 29 (shown schematically in FIG. 6) configured to transfer power to at least one of the wheels 18. The transmission 29 may be connected to one or both rear wheels 18 in one embodiment, but it is understood that the transmission 29 may be connected to transfer power directly to any number of the wheels 18, including, additionally or alternately, one or more of the front wheels 18 in some embodiments. It is understood that the transmission 29 may allow shifting between several settings (e.g. D, N, R) and several gears (e.g. various forward-drive gear ratios), as well as a "Park" (P) setting, in which the vehicle is stationary. Additional components connected to the engine may be included as well, including an exhaust pipe, an air cleaner assembly, etc. The vehicle 10 may include further components such as a fuel system (not shown), a light system (not shown), a brake system 30 (which may include a service or main brake as well as a parking brake), etc.

Figure 5:
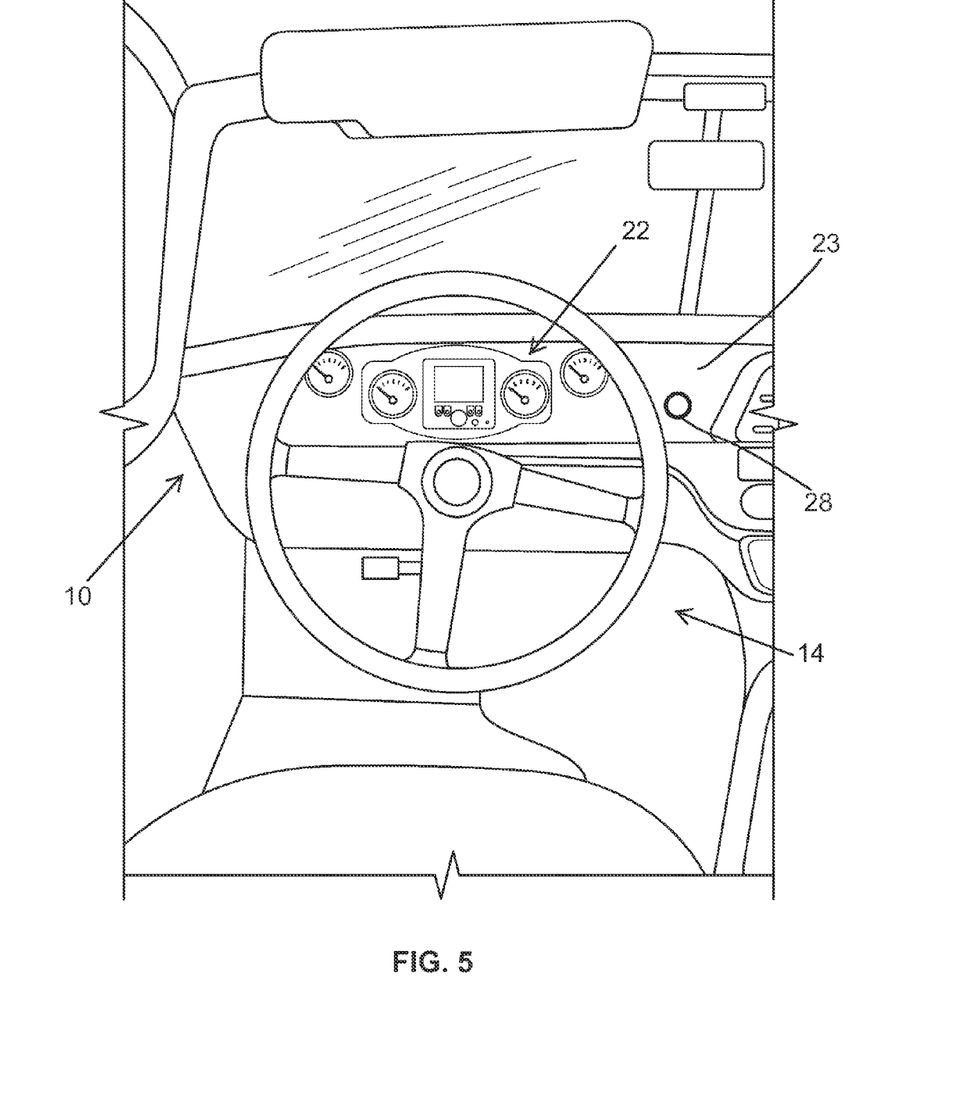
FIG. 5 is a plan view of one embodiment of an operator cab that may be incorporated with a vehicle as shown in FIG. 1.

The operator cab 14 generally includes passenger area, which in the embodiment of FIGS. 1-2, includes a single seat for the operator. In another embodiment, the cab 14 may include left and right seats, or possibly additional seats as well, and may be configured for left hand and/or right hand drive configuration. The operator cab 14 may also contain controls 22 for operating and monitoring the vehicle 10, some of which may be located on a dashboard 23, such as a steering wheel and various gauges/meters, such as shown in FIGS. 1 and 5. The controls 22 may also include various switches, controls, displays, etc., including for example an ignition switch, a speedometer and/or other monitors, and a transmission control (e.g. a stick or a push-button control), which may be located on or in the dashboard 23 and/or elsewhere within the cab 14. In a two-seat configuration, some controls 22 may be located on a console that may be positioned between the left and right sides of the cab. The controls 22 may further include actuators for a main or service braking system, which may be air brakes in one embodiment, a parking brake system, or a throttle (e.g., an accelerator), as well as controls for one or more components of the body, if a body is included. Further, the controls 22 may include a trailer connection actuator 28, which is configured for operating the trailer connection mechanism 11 to disconnect or reconnect the trailer 16. This actuator 28 may be embodied by one or more levers, buttons, switches, etc. The trailer connection mechanism 11 and/or some other controls 22 may be located on the exterior of the operator cab 14 in another embodiment. At least some of such controls 22 may be integrated into and/or controlled by a vehicle control system, as described herein.

In one implementation, the trailer connection mechanism 11 may be configured to couple to the complementary connection mechanism 20 (schematically depicted in FIG. 2) using a fifth-wheel coupling. As such, the vehicle 10 may be configured with a connection mechanism 11 comprising a fifth-wheel receiving device, and trailer 16 may be configured with complementary connection mechanism 20 comprising a pin structure configured to be received into the fifth-wheel receiving device of the connection mechanism 11. Further, those of ordinary skill in the art will recognize various specific implementations of a fifth-wheel connection mechanism, or other coupling mechanisms and/or configurations that may be implemented on vehicle 14 without departing from the disclosures described herein. In one example, the connection mechanism 11 may be configured to couple with the complementary connection mechanism 20 on trailer 16, and automatically lock until a release mechanism, such as a pneumatic release cylinder 318, is actuated.

Figure 3:
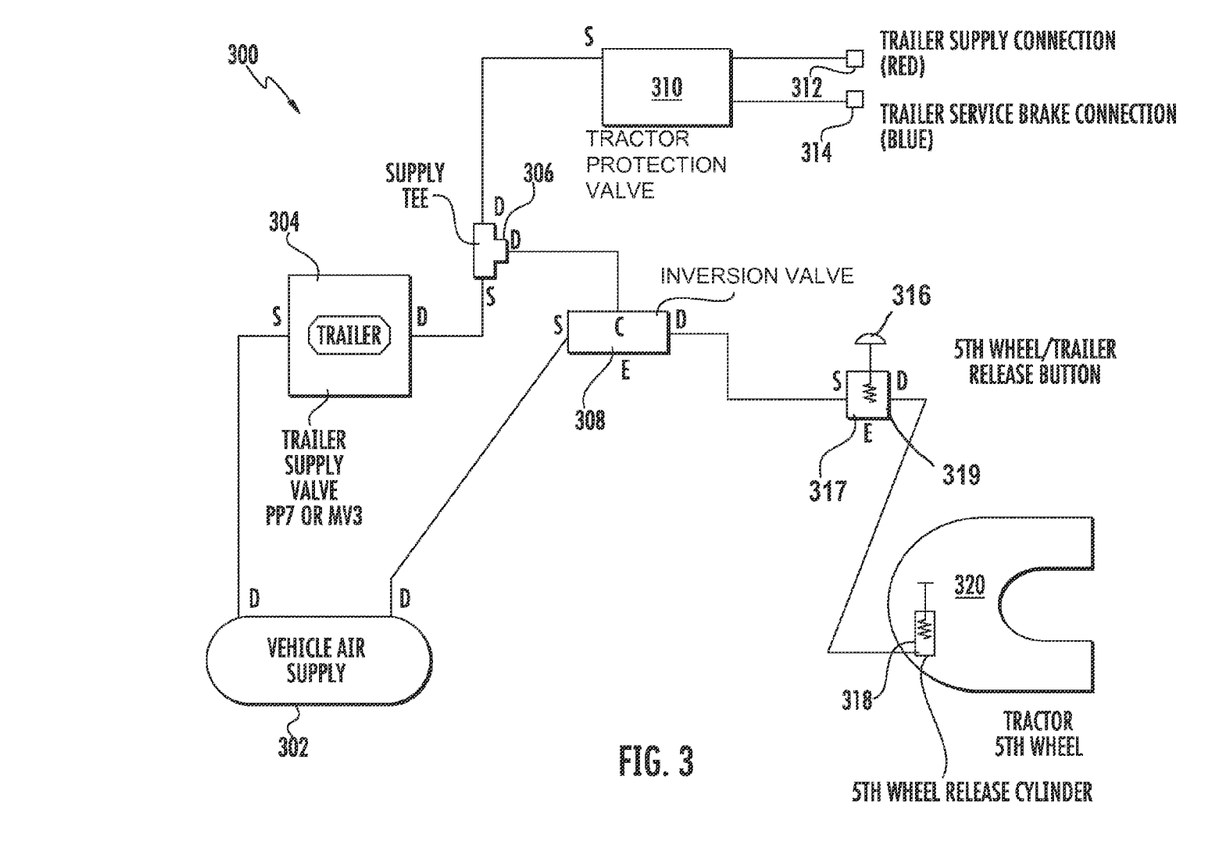
FIG. 3 is a schematic diagram showing one embodiment of a pneumatic circuit that may be utilized to provide for an improved connection between a tractor and trailer.

In one implementation, and as described in further detail in relation to FIG. 3, the trailer connection mechanism 11 may comprise a mechanical, or electro-mechanical release mechanism. In one example, the trailer connection mechanism 11 may comprise a pneumatic actuator configured decouple the complementary connection mechanism 20 from the connection mechanism 11 upon receiving a pneumatic signal. Accordingly, those of ordinary skill in the art will recognize various specific implementations of pneumatically-controlled release mechanisms, without departing from the scope of the disclosures described herein. Additionally or alternatively, the trailer connection mechanism 11 may be configured to decouple from the complementary connection mechanism 20 using one or more electro-mechanical devices (solenoid actuators, and the like), upon receipt of a control signal from one or more control interfaces, such as controls 22. As such, those ordinary skill in the art will recognize various specific and limitations of electro-mechanical actuator circuits that may be utilized to provide for decoupling of the connection mechanism 11 from the complementary connection mechanism 20, and without departing from the scope of the disclosures described herein.

Figure 6:
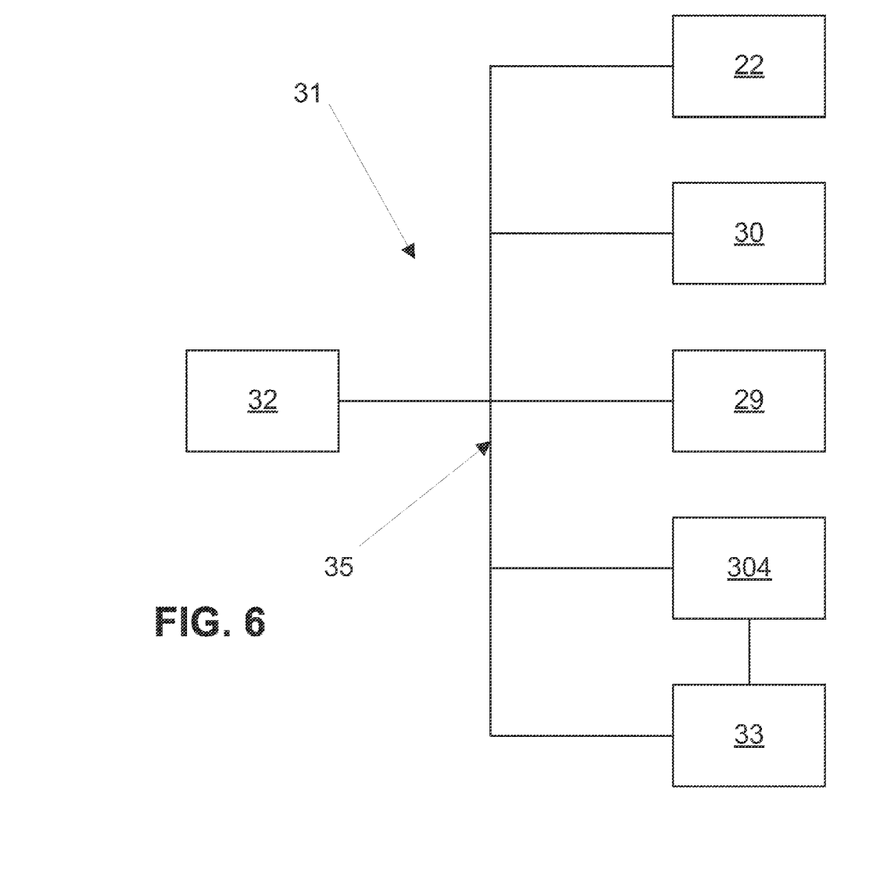
FIG. 6 is a schematic diagram showing one embodiment of a vehicle control system that is usable in connection with a vehicle according to aspects of the present disclosure.

The vehicle 10 generally includes a vehicle control system 31, which may include a primary vehicle controller 32, and may also include various controllers configured for controlling specific components of the vehicle 10, e.g., the engine, transmission 29, brake system 30, fuel system, etc. An example embodiment of such a vehicle control system 31 is illustrated in FIG. 6. It is understood that the primary vehicle controller 32 and/or other controllers described herein may be computer devices and may include a memory, a processor, an input/output, and/or other components known to those skilled in the art as part of a computer device. The vehicle 10 may also include an internal communication network 35 that is generally in communication with the various components of the vehicle control system 31 and other components of the vehicle 10, including the various controllers and components of the vehicle 10, allowing the components of the control system 31 to communicate with each other and with other systems via the network 35. The network 35 may be a J1939 databus network in one embodiment, and may be configured for wired and/or wireless data communication. The vehicle control system 31 may also be connected to various instrumentation, at least some of which may be visible and/or accessible from within the operator cab 14 for communicating information to the user, such as information regarding the operation of various vehicle systems and components. The vehicle control system 31 may further include a user interface (not shown) positioned within the operator cab 14, which can allow the operator to control and/or monitor various components of the vehicle 10. The trailer connection actuator 28 may be operated through the interface of the vehicle controller in one embodiment.

Figure 4:
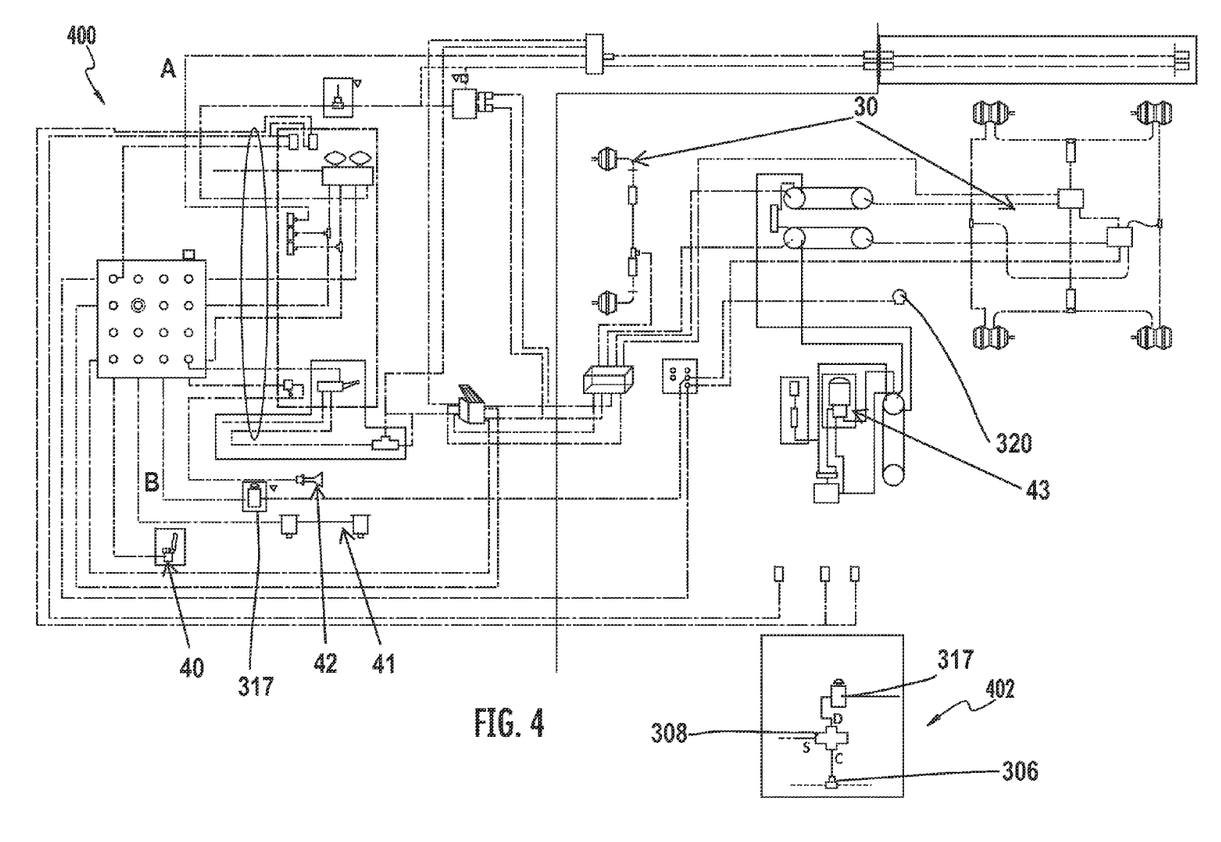
FIG. 4 is a schematic diagram of a pneumatic system that may be utilized on a vehicle that is configured to be connected to a trailer structure.

In one example, vehicle 10 includes a pneumatic control system 33, described in further detail in relation to FIG. 3 and FIG. 4, and shown schematically in FIG. 6. Accordingly, the pneumatic control system 33 may be actuated using one or more control interfaces, such as controls 22, accessible from within the operator cab 14 of vehicle 10. Advantageously, the pneumatic control system 33 may be utilized to provide a safety mechanism or anti-release mechanism 300 that is configured to prevent the trailer connection mechanism 11 from releasing the trailer 16 under certain conditions. For example, in one embodiment, the anti-release mechanism 300 may prevent the trailer connection mechanism 11 from being released unless a pneumatic supply (air supply) has been disconnected from the trailer 16. In one example, disconnecting a pneumatic supply, supplied by the vehicle 10 to the trailer 16, may engage a braking mechanism on the trailer 16.

In general, the vehicle 10 may be configured to selectively prevent or permit operation of the trailer connection mechanism 11 to release the trailer 16, based on the status of the transmission 29 and/or the brake system 30 of the vehicle 10. The vehicle 10 may include an anti-release mechanism 300 for this purpose. The anti-release mechanism 300 may be configured to detect statuses of the transmission 29 and/or the brake system 30 of the vehicle 10, and to selectively prevent or permit operation of the trailer connection mechanism 11 to release the trailer 16 unless the statuses of the transmission 29 and/or the brake system 30 correspond to predetermined criteria. For example, in one embodiment described herein, the anti-release mechanism 300 may prevent disconnection of the trailer 16 unless the transmission 29 is in Park and/or the brake system 30 is engaged. In one embodiment, the brake system 30 satisfies the criteria of being "engaged" if the main service brake is applied, but in other embodiments, the brake system 30 may be considered to be "engaged" if at least one of the main service brake and the parking brake is applied, or if both the main service brake and the parking brake are applied. The anti-release mechanism 300 may incorporate and/or communicate with various computer components, such as the vehicle controller 32 or other components of the vehicle control system 31, and the anti-release mechanism 300 may further incorporate and/or communicate with various pneumatic components, in various embodiments.

FIG. 3 is a schematic diagram of a pneumatic circuit of the anti-release mechanism 300. In particular, mechanism 300 includes a vehicle air supply 302, otherwise referred to as a pneumatic supply. Accordingly, those of ordinary skill in the art will recognize that supply 302 may comprise one or more compressor devices, and associated equipment, configured to provide a source of pressurized air. Indeed, those of ordinary skill in the art will recognize that the pneumatic circuit associated with the anti-release mechanism 300 may be configured with a pneumatic supply 302, and associated pneumatic circuit elements, configured for operation using any pressure rating, or range of pressures. It is also understood that elements identified as "S" and "C" in FIG. 3 function as pneumatic inputs and elements identified as "D" in FIG. 3 function as pneumatic outputs.

In one implementation, a valve 304 may be configured to control a supply of pressurized air from vehicle 10 to trailer 16. The valve 304 (also referred to as a "trailer supply valve") may be connected to the vehicle control system 31 and may be operated by the vehicle controller 32 or other controller within the control system 31. Operation of the valve 304 may be based on input from the transmission 29 and/or the braking system 30 (or separate controllers associated with the same), as described below. In one specific example, valve 304 may be a PP-7 valve, of a MV-3 valve, among others. Accordingly, in an open configuration, valve 304 is configured to allow air to flow from supply 302 to supply tee element 306. In turn, when in a closed configuration, valve 304 is configured to prevent air from flowing from supply 302 through to a splitting element, e.g., tee element 306. Further, tee element 306 is configured to split the pneumatic supply from valve 304, transmitting a first part of the supply to an inversion valve 308, and a second part of the supply to a tractor protection valve 310.

Tractor protection valve 310 may be embodied with any pneumatic valve configuration known to those of ordinary skill in the art. In one implementation, when in an open configuration, valve 310 is configured to transmit a pneumatic supply through to elements 312 and/or 314. In turn, when valve 310 is in a closed configuration, elements 312 and/or 314 will not receive a pneumatic supply/signal from supply 302. In one implementation, element 312 may be a trailer supply connection associated with trailer 16. Further, element 314 may be a trailer service brake connection associated with trailer 16. In one specific example, element 314 may provide a pneumatic supply to one or more braking systems associated with trailer 16 (not pictured), and such that if there is no pneumatic supply from valve 310 through to element 314, the one or more braking systems associated with trailer 16 may be automatically engaged.

In one implementation, element 308 may be configured as an inversion valve. Accordingly, inversion valve 308 may receive a first pneumatic supply directly from supply 302 (received at input "S" of valve 308), and a second pneumatic supply from supply tee 306 (received at input "C" of valve 308). In one implementation, while the inversion valve 308 is receiving a pneumatic signal at input "C" from supply tee 306, the inversion valve 308 is placed in a "closed" configuration and will not allow air to flow from supply 302 through to release button element 316 (i.e., through output "D"). As such, the pneumatic supply received at input "C" only serves as an input control signal in this embodiment, and is not passed through to release button 316. Accordingly, when the pneumatic supply received at input "c" is removed, such as when valve 304 is closed, inversion valve 308 is placed in an "open" configuration and will allow air to pass from the supply 302 through to the release button element 316.

The mechanism 300 may include a release assembly 317 that is configured to be actuated in order to operate the connection element 320 on the vehicle 10. The release assembly 317 may include a release button 316 that may be configured as a control interface configured for manual actuation. As such, release button 316 may be configured as one or more of controls 22, and may not necessarily be in the form of a button, i.e., a switch, toggle, touchscreen component, or other device configured for receiving user input. The release assembly 317 may also include a valve 319 that is actuated by the release button 316, thereby allowing the pneumatic signal to be communicated from the inversion valve 308 through to a release actuator 318. It is understood that the valve 319 actuated by the release button 316 is considered to be a component of the release assembly 317 in the embodiment of FIG. 3, but this valve may not be physically located near the release button 316 in one embodiment. In turn, the release actuator 318 may be a cylinder or other mechanical actuator configured to decouple the trailer 16 from the vehicle 10 at a connection element 320, which may be a fifth-wheel connection. The fifth-wheel connection element 320 may correspond to the trailer connection mechanism 11 and/or may be similar to the trailer connection mechanism 11 as shown in FIGS. 1-2, in various embodiments.

In one implementation, the anti-release mechanism 300 may prevent a user from inadvertently actuating release button 316 without first shutting off a pneumatic supply 302 to trailer 16 by closing valve 304. As described herein, the valve 304 may be activated to permit disengagement of the connection mechanism 11 only if the transmission 29 of vehicle 10 is in Park and/or the brake system 30 is engaged. In the embodiment of FIG. 3, the valve 304 is activated to permit disconnection of the trailer 16 by opening the valve 304 to permit pneumatic flow to activate the inversion valve 308, which allows pneumatic flow to the release actuator 318. It is understood that the activation of the valve 304 may be controlled by a computer component that detects the status of the transmission 29 and/or the brake system 30 and activates the valve 304 when the status(es) meet predetermined criteria. The vehicle controller 32 or another component of the vehicle control system 31 may provide this function in one embodiment, and the computer component controlling activation of the valve 304 may be additionally or alternately considered to be part of the anti-release mechanism 300. In this way, the anti-release mechanism 300 implemented by the pneumatic circuit of FIG. 3 provides for enhanced safety and/or reliability of operation of vehicle 10.

Those of ordinary skill in the art will recognize that the pneumatic circuit described in FIG. 3, and configured to provide the anti-release mechanism 300, may be implemented using electrical and/or electro-mechanical elements in addition to, or as an alternative to those pneumatic elements previously described. For example, supply 302 may be configured as an electrical supply, valves 304 and 310 may be configured as electrical switches, supply tee 306 may be configured as a branch in an electrical circuit, inversion valve 308 may be configured as, among others, a transistor element, or another logic gate or combination of logic gates, release button 316 may be configured as an electrical switch, and release cylinder 318 may be configured as a solenoid element, among others. As another example, the inversion valve 308 may be configured as a valve that is electrically activated, rather than pneumatically activated as in FIGS. 3-4.

Further, while the anti-release mechanism 300 has been described in relation to vehicle 10, those of ordinary skill in the art will recognize that the mechanism 300 may be utilized to provide for enhanced safety and/or liability for any fifth-wheel coupling mechanism between a vehicle and a trailer. Indeed, those of ordinary skill in the art will recognize that the systems and methods described herein related to the anti-release mechanism 300 may be utilized with any coupling mechanism between a vehicle and the trailer.

FIG. 4 is a schematic diagram of a pneumatic system that may be utilized on a vehicle configured to be connected to a trailer structure. In one specific example, system 400 may comprise the anti-release mechanism 300 described in relation to FIG. 3. For example, sub-circuit 402 may provide functionality similar to anti-release mechanism 300 from FIG. 3. Sub-circuit 402 as depicted in FIG. 4 includes a tee element 306, an inversion valve 308, and a release assembly 317 as described herein with respect to FIG. 3, and may contain any other components of the anti-release mechanism 300 shown and described herein. This sub-circuit 402 may be implemented at any appropriate location in the system 400, including at location A or location B in FIG. 4. Those of ordinary skill in the art will recognize that the various pneumatic elements described in system 400 represent one exemplary implementation, and other implementations of the functionality provided by system 400 may be utilized, without departing from the scope of the disclosures described herein. Briefly, the example pneumatic system 400 in FIG. 4 includes connections to other pneumatic components, including without limitation, an air seat 40, cab air suspension 41, air horn 42, fan clutch 43, brake system 30, etc.

The various systems and components described herein can be used in connection with methods of assembling and/or operating a vehicle 10 as described herein. Such a method of assembly may include providing a vehicle 10 and connecting an anti-release mechanism 300 as described herein to the vehicle 10. Such a method of operation may include providing a vehicle 10 with an anti-release mechanism 300 as described herein and operating the anti-release mechanism 300. It is understood that the systems and components described herein can be used in connection with other methods as well.

The embodiments of the trailer connection described herein provide benefits and advantages over existing designs. For example, the trailer connection can resist or prevent accidental disconnection of the trailer from the vehicle, at least while the vehicle is in motion and poses a greater potential hazard. Still other benefits and advantages are explicitly or implicitly described herein and/or recognized by those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Relative terms such as "first," "second," etc., as used herein, are intended for illustrative purposes only and do not limit the embodiments in any way. Additionally, the term "plurality," as used herein, indicates any number greater than one, either disjunctively or conjunctively, as necessary, up to an infinite number. Further, "providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention, and the scope of protection is only limited by the scope of the accompanying Claims.

What is claimed is:

1. A system for use with a vehicle, the system comprising:
a trailer connection mechanism configured to be mounted on the vehicle and configured for releasable connection to a trailer, the trailer connection mechanism comprising a release actuator configured to release the connection between the trailer connection mechanism and the trailer;
a release assembly connected to the release actuator and configured to cause the release actuator to release the connection between the trailer connection mechanism and the trailer upon receiving user input; and
an anti-release mechanism connected to the trailer connection mechanism, the anti-release mechanism configured to detect a status of at least one of a transmission and a brake system of the vehicle, wherein the anti-release mechanism is further configured to prevent operation of the release actuator to release the connection between the trailer connection mechanism and the trailer unless (a) the transmission is in Park, (b) the brake system is engaged, or both (a) and (b), wherein the anti-release mechanism further comprises a pneumatic valve configured to be activated when (a) the transmission is in Park, (b) the brake system is engaged, or both (a) and (b), to permit operation of the release actuator to release the connection between the trailer connection mechanism and the trailer, and the anti-release mechanism further comprises a pneumatic inversion valve in communication with the release assembly and with the pneumatic valve, wherein the anti-release mechanism is configured such that activation of the pneumatic valve causes activation of the pneumatic inversion valve to permit operation of the release actuator to release the connection between the trailer connection mechanism and the trailer, and wherein the pneumatic valve is further configured to be in communication with a trailer brake on the trailer, and wherein the anti-release mechanism is configured such that activation of the pneumatic valve is configured to cause the trailer brake to be engaged when (a) the transmission is in Park, (b) the brake system is engaged, or both (a) and (b).

2. The system of claim 1, wherein the trailer connection mechanism is a fifth-wheel mechanism.

3. The system of claim 1, wherein activation of the pneumatic valve to permit operation of the release actuator to release the connection between the trailer connection mechanism and the trailer comprises closing the pneumatic valve.

4. A system for use with a vehicle, the system comprising:
a trailer connection mechanism configured to be mounted on the vehicle and configured for releasable connection to a trailer, the trailer connection mechanism comprising a release actuator configured to release the connection between the trailer connection mechanism and the trailer;
a release assembly connected to the release actuator and configured to cause the release actuator to release the connection between the trailer connection mechanism and the trailer upon receiving user input; and
an anti-release mechanism connected to the trailer connection mechanism, the anti-release mechanism configured to detect a status of at least one of a transmission and a brake system of the vehicle, wherein the anti-release mechanism is further configured to prevent operation of the release actuator to release the connection between the trailer connection mechanism and the trailer unless (a) the transmission is in Park, (b) the brake system is engaged, or both (a) and (b),
wherein the anti-release mechanism is further configured to cause activation of a trailer brake on the trailer when (a) the transmission is in Park, (b) the brake system is engaged, or both (a) and (b).

5. The system of claim 4, wherein the anti-release mechanism further comprises a pneumatic valve configured to be activated when (a) the transmission is in Park, (b) the brake system is engaged, or both (a) and (b), to permit operation of the release actuator to release the connection between the trailer connection mechanism and the trailer.

6. The system of claim 5, wherein the anti-release mechanism further comprises a pneumatic inversion valve in communication with the release assembly and with the pneumatic valve, wherein the anti-release mechanism is configured such that activation of the pneumatic valve causes activation of the pneumatic inversion valve to permit operation of the release actuator to release the connection between the trailer connection mechanism and the trailer.

7. The system of claim 6, wherein the pneumatic valve is further configured to be in communication with the trailer brake on the trailer, and wherein the anti-release mechanism is configured such that activation of the pneumatic valve is configured to cause the trailer brake to be engaged when the (a) transmission is in Park, (b) the brake system is engaged, or both (a) and (b).

8. The system of claim 4, wherein the anti-release mechanism further comprises a pneumatic inversion valve in communication with the release assembly, wherein the anti-release mechanism is configured such that the pneumatic inversion valve can be activated to permit operation of the release actuator to release the connection between the trailer connection mechanism and the trailer.

9. A vehicle comprising:
a chassis supported by a plurality of wheels;
a drivetrain including an engine and a transmission operably coupled to transfer power to at least one of the wheels;
a brake system connected to at least one of the wheels;
a trailer connection mechanism mounted on the vehicle and configured for releasable connection to a trailer, the trailer connection mechanism comprising a release actuator configured to release the connection between the trailer connection mechanism and the trailer;
a release assembly connected to the release actuator and configured to cause the release actuator to release the connection between the trailer connection mechanism and the trailer upon receiving user input; and
an anti-release mechanism connected to the trailer connection mechanism and the release assembly, the anti-release mechanism configured to detect a status of at least one of the transmission and the brake system of the vehicle, wherein the anti-release mechanism is further configured to prevent operation of the release actuator to release the connection between the trailer connection mechanism and the trailer unless (a) the transmission is in Park, (b) the brake system is engaged, or both (a) and (b),
wherein the anti-release mechanism further comprises a pneumatic valve configured to be activated when (a) the transmission is in Park, (b) the brake system is engaged, or both (a) and (b), to permit operation of the release actuator to release the connection between the trailer connection mechanism and the trailer, and the anti-release mechanism further comprises a pneumatic inversion valve in communication with the release assembly and with the pneumatic valve, wherein the anti-release mechanism is configured such that activation of the pneumatic valve causes activation of the pneumatic inversion valve to permit operation of the release actuator to release the connection between the trailer connection mechanism and the trailer, and
wherein the pneumatic valve is further configured to be in communication with a trailer brake on the trailer, and wherein the anti-release mechanism is configured such that activation of the pneumatic valve is configured to cause the trailer brake to be engaged when (a) the transmission is in Park, (b) the brake system is engaged, or both (a) and (b).

10. The vehicle of claim 9, wherein the trailer connection mechanism is a fifth-wheel mechanism.

11. A vehicle comprising:
a chassis supported by a plurality of wheels;
a drivetrain including an engine and a transmission operably coupled to transfer power to at least one of the wheels;
a brake system connected to at least one of the wheels;
a trailer connection mechanism mounted on the vehicle and configured for releasable connection to a trailer, the trailer connection mechanism comprising a release actuator configured to release the connection between the trailer connection mechanism and the trailer;
a release assembly connected to the release actuator and configured to cause the release actuator to release the connection between the trailer connection mechanism and the trailer upon receiving user input; and
an anti-release mechanism connected to the trailer connection mechanism and the release assembly, the anti-release mechanism configured to detect a status of at least one of the transmission and the brake system of the vehicle, wherein the anti-release mechanism is further configured to prevent operation of the release actuator to release the connection between the trailer connection mechanism and the trailer unless (a) the transmission is in Park, (b) the brake system is engaged, or both (a) and (b),
wherein the anti-release mechanism is further configured to cause activation of a trailer brake on the trailer when (a) the transmission is in Park, (b) the brake system is engaged, or both.

12. The vehicle of claim 11, wherein the anti-release mechanism further comprises a pneumatic valve configured to be activated when (a) the transmission is in Park, (b) the brake system is engaged, or both (a) and (b), to permit operation of the release actuator to release the connection between the trailer connection mechanism and the trailer.

13. The vehicle of claim 12, wherein the anti-release mechanism further comprises a pneumatic inversion valve in communication with the release assembly and with the pneumatic valve, wherein the anti-release mechanism is configured such that activation of the pneumatic valve causes activation of the pneumatic inversion valve to permit operation of the release actuator to release the connection between the trailer connection mechanism and the trailer.

14. The vehicle of claim 13, wherein the pneumatic valve is further configured to be in communication with a trailer brake on the trailer, and wherein the anti-release mechanism is configured such that activation of the pneumatic valve is configured to cause the trailer brake to be engaged when (a) the transmission is in Park, (b) the brake system is engaged, or both (a) and (b).

15. The vehicle of claim 11, wherein the anti-release mechanism further comprises a pneumatic inversion valve in communication with the release assembly, wherein the anti-release mechanism is configured such that the pneumatic inversion valve can be activated to permit operation of the release actuator to release the connection between the trailer connection mechanism and the trailer.

16. A vehicle comprising:
a chassis supported by a plurality of wheels;
a drivetrain including an engine and a transmission operably coupled to transfer power to at least one of the wheels;
a brake system connected to at least one of the wheels;
a trailer connection mechanism mounted on the vehicle and configured for releasable connection to a trailer, the trailer connection mechanism comprising a release actuator configured to release the connection between the trailer connection mechanism and the trailer;
a release assembly connected to the release actuator and configured to cause the release actuator to release the connection between the trailer connection mechanism and the trailer upon receiving user input; and
an anti-release mechanism connected to the trailer connection mechanism and the release assembly, wherein the anti-release mechanism further comprises a computer component connected to the transmission and the brake system and configured to detect a status of at least one of the transmission and the brake system, wherein the computer component is further configured to cause the anti-release mechanism to prevent operation of the release actuator unless (a) the transmission is in Park, (b) the brake system is engaged, or both (a) and (b).

17. A system for use with a vehicle, the system comprising:
a trailer connection mechanism configured to be mounted on the vehicle and configured for releasable connection to a trailer, the trailer connection mechanism comprising a release actuator configured to release the connection between the trailer connection mechanism and the trailer;
a release assembly connected to the release actuator and configured to cause the release actuator to release the connection between the trailer connection mechanism and the trailer upon receiving user input; and
an anti-release mechanism connected to the trailer connection mechanism, wherein the anti-release mechanism is configured to detect a status of both a transmission and a brake system of the vehicle, and wherein the anti-release mechanism is configured to prevent operation of the release actuator to release the connection between the trailer connection mechanism and the trailer unless the transmission is in Park and the brake system is engaged.

18. The system of claim 17, wherein the anti-release mechanism further comprises a computer component connected to the transmission and the brake system and configured to detect the status of the transmission and the brake system, wherein the computer component is further connected to the anti-release mechanism and is configured to cause the anti-release mechanism to prevent operation of the release actuator unless the transmission is in Park and the brake system is engaged.

19. The system of claim 17, wherein the anti-release mechanism further comprises a pneumatic valve configured to be activated when the transmission is in Park and the brake system is engaged, to permit operation of the release actuator to release the connection between the trailer connection mechanism and the trailer.

20. The system of claim 19, wherein the anti-release mechanism further comprises a pneumatic inversion valve in communication with the release assembly and with the pneumatic valve, wherein the anti-release mechanism is configured such that activation of the pneumatic valve causes activation of the pneumatic inversion valve to permit operation of the release actuator to release the connection between the trailer connection mechanism and the trailer.

21. The system of claim 20, wherein the pneumatic valve is further configured to be in communication with a trailer brake on the trailer, and wherein the anti-release mechanism is configured such that activation of the pneumatic valve is configured to cause the trailer brake to be engaged when the transmission is in Park and the brake system is engaged.

22. A vehicle comprising:
- a chassis supported by a plurality of wheels;
- a drivetrain including an engine and a transmission operably coupled to transfer power to at least one of the wheels;
- a brake system connected to at least one of the wheels;
- a trailer connection mechanism mounted on the vehicle and configured for releasable connection to a trailer, the trailer connection mechanism comprising a release actuator configured to release the connection between the trailer connection mechanism and the trailer;
- a release assembly connected to the release actuator and configured to cause the release actuator to release the connection between the trailer connection mechanism and the trailer upon receiving user input; and
- an anti-release mechanism connected to the trailer connection mechanism and the release assembly, wherein the anti-release mechanism is configured to detect a status of both the transmission and the brake system of the vehicle, and wherein the anti-release mechanism is configured to prevent operation of the release actuator to release the connection between the trailer connection mechanism and the trailer unless the transmission is in Park and the brake system is engaged.

23. The vehicle of claim 22, wherein the anti-release mechanism further comprises a computer component connected to the transmission and the brake system and configured to detect the status of the transmission and the brake system, wherein the computer component is further connected to the anti-release mechanism and is configured to cause the anti-release mechanism to prevent operation of the release actuator unless the transmission is in Park and the brake system is engaged.

24. The vehicle of claim 23, wherein the anti-release mechanism further comprises a pneumatic valve configured to be activated by the computer component when the transmission is in Park and the brake system is engaged, to permit operation of the release actuator to release the connection between the trailer connection mechanism and the trailer and a pneumatic inversion valve in communication with the release assembly and with the pneumatic valve, wherein the anti-release mechanism is configured such that activation of the pneumatic valve causes activation of the pneumatic inversion valve to permit operation of the release actuator to release the connection between the trailer connection mechanism and the trailer.

25. The vehicle of claim 24, wherein the pneumatic valve is further configured to be in communication with a trailer brake on the trailer, and wherein the anti-release mechanism is configured such that activation of the pneumatic valve is configured to cause the trailer brake to be engaged when the transmission is in Park and the brake system is engaged.

26. A system for use with a vehicle, the system comprising:
- a trailer connection mechanism configured to be mounted on the vehicle and configured for releasable connection to a trailer, the trailer connection mechanism comprising a release actuator configured to release the connection between the trailer connection mechanism and the trailer;
- a release assembly connected to the release actuator and configured to cause the release actuator to release the connection between the trailer connection mechanism and the trailer upon receiving user input; and
- an anti-release mechanism connected to the trailer connection mechanism, wherein the anti-release mechanism further comprises a computer component configured to be connected to a transmission and a brake system and configured to detect a status of at least one of the transmission and the brake system, wherein the computer component is further configured to cause the anti-release mechanism to prevent operation of the release actuator unless (a) the transmission is in Park, (b) the brake system is engaged, or both (a) and (b).

27. A system for use with a vehicle, the system comprising:
- a trailer connection mechanism configured to be mounted on the vehicle and configured for releasable connection to a trailer, the trailer connection mechanism comprising a release actuator configured to release the connection between the trailer connection mechanism and the trailer;
- a release assembly connected to the release actuator and configured to cause the release actuator to release the connection between the trailer connection mechanism and the trailer upon receiving user input; and
- an anti-release mechanism connected to the trailer connection mechanism, the anti-release mechanism comprising:
  - a trailer supply valve configured to control a supply of pressurized air from the vehicle to the trailer;
  - a pneumatic inversion valve in communication with the release assembly and with the trailer supply valve, wherein the anti-release mechanism is configured such that closing the trailer supply valve causes activation of the pneumatic inversion valve to permit operation of the release actuator to release the connection between the trailer connection mechanism and the trailer, and
  - wherein the trailer supply valve is further configured to be in communication with a trailer brake on the trailer, and wherein the anti-release mechanism is configured such that closing the trailer supply valve is also configured to cause the trailer brake to be engaged.

* * * * *